Oct. 6, 1942.   C. C. WHITTAKER   2,298,185
TROLLEY FROG CONTROL SYSTEM
Filed Jan. 28, 1942
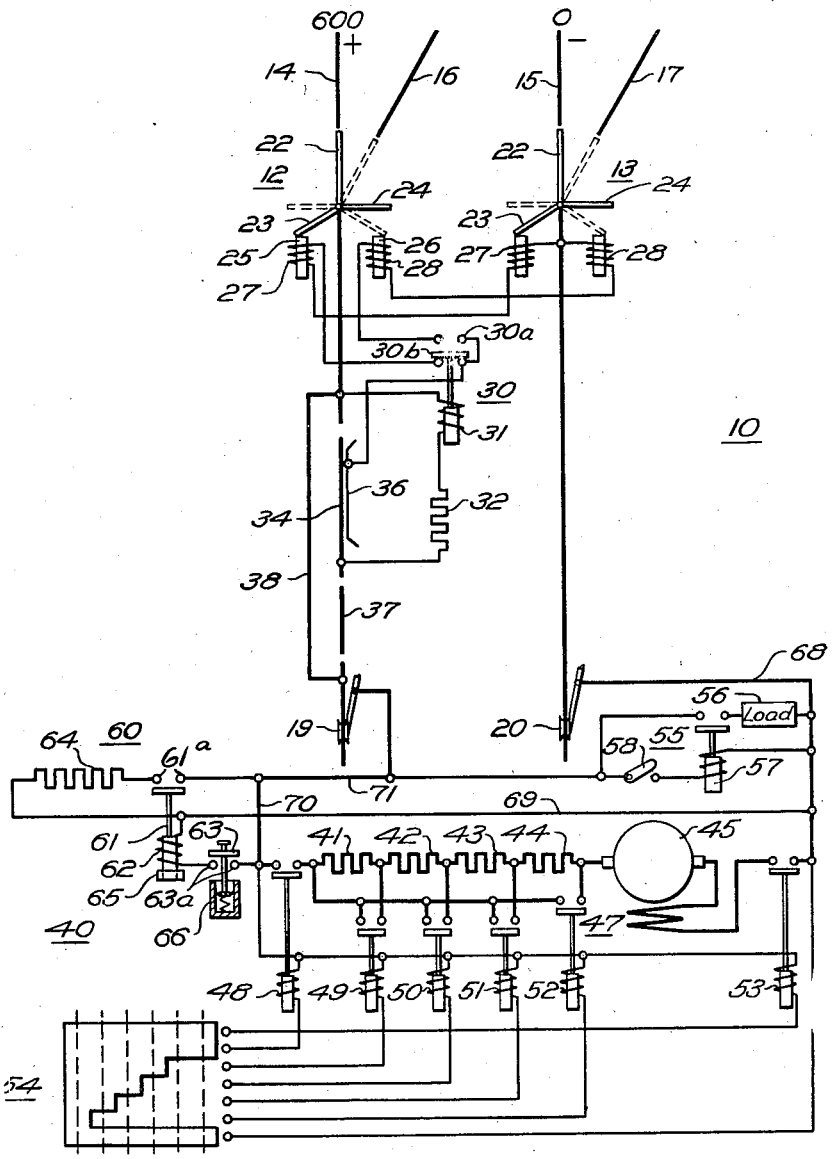
WITNESSES:
Robert C. Baird.
F.V. Giolma
INVENTOR
Charles C. Whittaker.
BY
G.M. Crawford
ATTORNEY Patented Oct. 6, 1942

2,298,185

UNITED STATES PATENT OFFICE 2,298,185

TROLLEY FROG CONTROL SYSTEM

Charles C. Whittaker, Pittsburgh, Pa., assignor to Westinghouse Electric & Manufacturing Company, East Pittsburgh, Pa., a corporation of Pennsylvania Application January 28, 1942, Serial No. 428,495

11 Claims. (Cl. 191—38)

My invention relates, generally, to control systems and it has reference, in particular, to trolley frog control systems for selectively controlling the operation of trolley frogs at intersections in trolley conductor systems such as may be used to supply power to trolley busses.

Generally stated, it is an object of my invention to provide a simple and inexpensive system for selectively controlling the operation of trolley frogs in an overhead trolley conductor system.

More specifically, it is an object of my invention to provide for selectively controlling the operation of trolley frogs at intersections between main and branch conductors in trolley conductor systems without requiring the operator of an electrically operated vehicle to pre-position the vehicle motor controller to effect such operation.

It is also an object of my invention to provide for predetermining the operation of trolley frogs at intersections in trolley conductor systems in accordance with the operator's wishes without requiring any predetermined maneuvering of the vehicle or operation of vehicle motor controller as the vehicle approaches the intersection.

Another object of the invention is to provide for automatically predetermining the operation of trolley frogs at intersections in response to predetermined currents drawn by the vehicle when it is in a predetermined position in advance of the intersection.

A further object of my invention is to provide a trolley frog control system wherein the operator may preset a control circuit on the vehicle any suitable distance in advance of the intersection to effect a subsequent automatic operation of the trolley frogs as the vehicle approaches the intersection regardless of the maneuvering of the vehicle or operation of the vehicle motor controller.

Other objects will in part be obvious, and will in part be explained hereinafter.

In accordance with my invention selective operation of trolley frogs at intersections in overhead trolley conductor systems may be easily effected from the vehicle without requiring the operator to pre-position the vehicle motor controller in a "power off" or "power on" position as the vehicle approaches the intersection, and without requiring him to maneuver the vehicle into any predetermined position relative to the trolley conductors. A current responsive relay connected between an isolated section of the conductor and the main conductor selectively controls the operation of the trolley frogs. Operation of the control relay is effected by means of an auxiliary control circuit on the vehicle which provides a sufficiently low resistance path when one of the vehicle current collectors engages the isolated conductor section to pass a control current of predetermined value for operating the control relay. An insulated section positioned in advance of the isolated section provides an automatic momentary deenergizing of the principal vehicle circuits, including the motor and auxiliary circuits, thus preventing incorrect operation of the control relay by motor or auxiliary circuit currents, regardless of the position of the vehicle motor controller.

For a more complete understanding of the nature and scope of my invention reference may be had to the accompanying drawing in which the single figure illustrates diagrammatically a trolley frog control system embodying the principal features of the invention.

Referring to the drawing, the reference numeral 10 may denote generally a trolley frog control system for effecting selective control of the trolley frogs 12 and 13, which may be positioned at the intersections between main conductors 14 and 15 and their associated branch conductors 16 and 17, respectively, to selectively guide the current collectors 19 and 20 of an electrically operated vehicle (not shown) along the main conductors or onto the branch conductors, as desired.

The trolley frogs 12 and 13 may be of similar construction, comprising, for example, pivoted tongues 22 for guiding current collectors along the main or onto the branch conductors, and armatures 23 and 24 operatively connected thereto and associated with solenoids 25 and 26 having operating windings 27 and 28, respectively, for effecting operation of the tongues 22 to different positions.

Energization of the operating windings 27 and 28 may be effected selectively by means of a control relay 30, which may be responsive to a control current of predetermined value. The control relay 30 may be provided with an operating winding 31 connected in series circuit relation with a suitable current limiting resistor 32 between the main conductor 14 and a conducting section or runner portion 34, which may be positioned in alignment with, but in spaced and insulated relation to, the main conductor 14. The operating windings 27 and 28 of the trolley frogs may be connected between the conductors 14 and 15 in any suitable manner, such as by connecting one end of each to the negative trolley conductor 15, and the other ends to the positive trolley conductor 14 by means of a contact device 36, which may be positioned alongside the isolated section 34 and in spaced relation thereto so as to be engaged by the current collector 19 and connected to the conductor 14 as the collector passes along the isolated section. Means such as the insulated section 37 may be provided in advance of the isolated section 34 for a purpose which will be fully explained hereinafter. A shunt 39 may be provided for effecting a conducting path about the isolated section 34 and the insulated section 37.

The reference numeral 40 may denote generally the vehicle control system of a well known type. As shown, the control system may include a plurality of accelerating resistors 41, 42, 43 and 44 connected in series circuit relation with the armature 45 of the vehicle motor 47 constituting the power circuit of the vehicle. Connection of these resistors and the armature to the current collectors 19 and 20 may be effected by the main switches 48 and 53 and the resistors controlled by the resistor shunting switches. The main switches 49, 50, 51 and 52 and resistor shunting switches may be controlled by a master controller 54. These switches will be referred to, hereinafter, as the power control switches. The vehicle may also be provided with one or more auxiliary circuits for lights, pumps, etc., such as, for example, the auxiliary circuit 55 which may comprise a load device 56 connected to the current collectors by means of an auxiliary relay 57 under the control of a switch 58. The power and auxiliary circuits may be termed the principal circuits of the vehicle.

In order to provide for effecting selective operation of the trolley frogs 12 and 13 in accordance with the wishes of the operator, means may be provided on the vehicle for selectively controlling the operation of the control relay 30. For example, an auxiliary control circuit indicated generally by the numeral 60 may be provided, comprising an auxiliary control relay 61 having an operating winding 62 which may be connected between the current collectors 19 and 20 by means of a control switch 63, and which may be responsive to lower control voltages than the power control switches or auxiliary relay. The connection of a control resistor 64 to provide a relatively low resistance path between the current collectors 19 and 20 for a control current of predetermined value for securing operation of the control relay 30 may be effected by means of the relay 61.

In order to enable the operator to pre-set the control circuit 60 some distance in advance of the intersection and then give his complete attention to the operation of the vehicle, suitable means may be provided for maintaining the control circuit. For example, the control relay 61 may be of the time delay type, provided with a short-circuited damper winding 65 so as to remain in the energized position for a predetermined time after deenergization, or the control switch 63 may be provided with means such as the dashpot device 66 which permits immediate closure of the contact members 64a and prevents their opening for a predetermined time, so as to maintain an energizing circuit for the operating winding 62 between the current collectors 19 and 20. Completion of the control circuit 60 may thus be insured at the time the current collector 19 engages the contact device 36, so that selective control of the control relay 30 may be effected. Other suitable means well known in the art may be utilized for maintaining the control circuit, such as, for example, a catch or latch mechanism associated with switch 63 or control relay 61 or other suitable means.

The isolated section 34, contact device 36 and insulated section 37 may be positioned any suitable distance in advance of the intersection so as to permit the operator to pre-position the tongues of the trolley frogs 12 and 13 a relatively long time or distance before the vehicle enters the intersection. The operator may then give his full attention to the operation of the vehicle with the full assurance that the trolley frogs will be operated to the desired position when the vehicle reaches the intersection. If the operator desires to direct the current collectors onto the branch conductors, he may, as the vehicle approaches the intersection, close the control switch 63 to effect energization of the control winding 62 of the auxiliary control relay 61 over a circuit from the current collector 20 through conductors 68 and 69, operating winding 62, control switch 63, conductors 70 and 71 to the current collector 19. The control circuit is thus established between the current collectors 19 and 20 extending through the conductor 71, contact members 61a of the auxiliary control switch, control resistor 64, conductors 69 and 68 to the current collector 20.

When the current collector 19 engages the insulating section 37 it becomes deenergized. The power control switches 48 through 53 and the auxiliary relay 57 are deenergized. Consequently, the power control switches and the auxiliary relay 57 return to the deenergized position interrupting their respective power and auxiliary circuits, so that the principal vehicle circuits are deenergized, regardless of the positions of the controller 54 and the control switch 58. The auxiliary control relay 61 remains in the energized position, or the control switch 63 remains closed for a predetermined time after operation, so that the control relay picks up immediately the collector 19 engages the section 34. A path for a predetermined control current is thereby provided through the control resistor 64 when the current collector 19 engages the isolated section 34, and the control relay 30 is operated by the predetermined control current drawn by the control resistor 64 through the operating winding 31 of the control relay. The control relay 30 operates to open contact members 30b and close contact members 30a thus completing an energizing circuit for the operating windings 28 of the trolley frogs 12 and 13. The tongues 22 are thereby actuated by the armatures 24 to the "turn" position so as to guide the current collectors 19 and 20 onto the branch conductors 16 and 17, respectively. The power control switches remain in the deenergized position since only a reduced voltage is applied thereto through the isolated section 34.

If the operator desires to continue along the main conductors 14 and 15, the control switch 63 may be left in the open position. As the current collector 19 leaves the main conductor 14 and moves onto the insulated section 37 the power circuits and auxiliary circuits of the vehicle will be interrupted as before. Thus, when the current collector 19 traverses the isolated section 34, the control relay 30 remains in the deenergized position, as shown, since the current drawn by the operating windings of the power control switches and the auxiliary relays of the vehicle through the operating winding 31 of the control relay and the current limiting resistor 32 is insufficient to effect operation of the control relay 61. When the current collector 19 engages the contact device 36, the operating windings 27 of the trolley frogs 12 and 13 will be energized to operate the tongues 22 to the "through" position for travel directly along the main conductors.

From the above description and the accompanying drawing, it will be apparent that I have provided a simple and effective control system for insuring positive operation of trolley frogs at intersections in trolley conductor systems. Only a single overhead contact device is required, and selective control of the trolley frogs may be readily effected without requiring the operator to maintain the vehicle controller in the "on" or "off" positions for any length of time or during any predetermined amount of travel. Furthermore the operator is not required to maneuver the vehicle in any predetermined manner as he approaches the intersection so as to maintain the current collectors in a predetermined longitudinal relation to effect the desired operation of the trolley frogs. Since the control devices in the overhead system may be positioned any desired distance in advance of the intersection and the operator may easily predetermine the position of the trolley frogs quite some time before he reaches the intersection, his full attention may be devoted to the operation of the vehicle which is a great advantage at busy intersections and on hills where it may be undesirable to maintain the vehicle controller in a predetermined position for a relatively long period, owing to the difficulty of always securing sufficient momentum to maintain the forward movement of the vehicle when the controller is in the "off" position.

Since certain changes may be made in the above description, and other embodiments of the invention may be made without departing from the spirit thereof, it is intended that all the matter contained in the above description and shown in the accompanying drawing shall be considered as illustrative and not in a limiting sense.

I claim as my invention:

1. A trolley frog control system comprising, relay means for selectively controlling the operation of the trolley frog operable in response to predetermined circuit conditions on a passing vehicle having a power controller therefor, means effecting momentary deenergization of the principal circuits on the vehicle prior to operation of the relay means, and auxiliary circuit means on the vehicle effecting predetermined circuit conditions on the vehicle independently of the vehicle power controller to provide for operation of the relay means.

2. A trolley frog control system comprising, means effecting momentary deenergization of the power circuit of the vehicle at a predetermined point in advance of the trolley frog, a control circuit on the vehicle effective to provide predetermined circuit conditions after the power circuit is deenergized, and control means responsive to the predetermined circuit conditions selectively controlling the operation of the trolley frog.

3. The combination in a control system for a trolley frog, of relay means for selectively controlling the operation of the trolley frog, control means on an electrically operated vehicle having a motor control circuit operable to control the operation of the relay means, and means associated with the relay means effective to deenergize the motor control circuit independently of the control means.

4. A system for controlling the operation of a trolley frog at an intersection in a trolley conductor system comprising, means operable to selectively control the operation of the trolley frog, circuit means including a control circuit on an electrically operated vehicle having a motor control circuit operable to effect operation of said means in response to a predetermined current drawn by the vehicle, and means effective to deenergize the motor control circuit a predetermined distance in advance of the intersection.

5. A control system for a trolley frog positioned at an intersection between main and branch conductors and operable to selectively guide a current collector of an electrically operated vehicle having motor control means controlling a motor circuit comprising, control means connected in series with the main conductor responsive to a predetermined value of current drawn by the vehicle operable to control the operation of the trolley frog, circuit means on the vehicle to provide a control current of predetermined value for operating the control means, and means providing a deenergized portion in the main conductor to effect deenergization of the motor control means prior to operation of the control means.

6. A control system for a trolley frog positioned at an intersection between main and branch trolley conductors operable to guide a current collector of an electrically operated vehicle along the main conductor or onto the branch conductor comprising, relay means connected to a portion of the conductor responsive to a predetermined current drawn by a passing current collector to effect a predetermined operation of the trolley frog, a plurality of control circuits on the vehicle connected to the current collector including one arranged to draw a predetermined control circuit, and means responsive to the passage of a vehicle current collector to effect deenergization of the control circuits other than said one so that the current collector draws only the predetermined current when it engages said portion of the conductor.

7. The combination in a control system for a trolley frog positioned at an intersection in a trolley conductor system, of a contact device adapted to be engaged by a current collector of a vehicle, relay means responsive to predetermined vehicle circuit conditions controlling the operation of the trolley frog from the contact device, a plurality of control circuits on the vehicle controlled by relays energized from the current collector, an additional control circuit for providing a predetermined control current path, relay means controlling the additional control circuit having time delay characteristics whereby it maintains the energization of the said additional control circuit after the deenergization of the other relays, and means effecting deenergization of said other relays immediately prior to engagement of the current collector with the contact device.

8. The combination with a trolley frog controlled by control means connected between spaced conductor sections for guiding the current collector of an electrically operated vehicle having a plurality of power circuits controlled by relays energized under the control of a controller from the current collector, of an insulated runner member positioned in advance of the control means for effecting deenergization of the said relay, and means on the vehicle providing a control circuit for selectively operating the control means while the said relays are deenergized.

9. A control system for a trolley frog positioned at an intersection between main and branch conductors for guiding a current collector of an electrically operated vehicle having a plurality of control circuits connected to the current collector including auxiliary control circuits and principal control circuits connected by control relays normally controlled by a controller comprising, a relay responsive to a current of predetermined value greater than that of the auxiliary circuits connected between the conductor and an isolated section thereof controlling the operation of the trolley frog, an insulated section positioned immediately in advance of the isolated section to deenergize the current collector, and a control circuit on the vehicle drawing a current sufficient to operate the relay effective to insure a control current path substantially immediately after the current collector engages the isolated section.

10. A control system for operating a trolley frog to selectively guide the current collector of an electrically operated vehicle along a main conductor or onto an intersecting branch conductor comprising, control means responsive to a current of a predetermined value connected in series circuit relation with an isolated portion of the main conductor and the main conductor operable to control the operation of the trolley frog, a control circuit connected by the current collector of a vehicle having a plurality of power circuits to the current collector to a contact device adjacent the main conductor, said control circuit providing a path for the predetermined current required to operat the control means and including time delay means to effect closure of the control circuit for a predetermined time after closure, so long as the current collector engages an energized portion of the conductor, and an insulated section positioned in the main conductor in advance of the isolated portion to insure deenergization of the power circuits when the current collector engages the isolated portion of the conductor regardless of the position of the controller.

11. A control system for a pair of trolley frogs in an overhead trolley bus system at the intersection of main and branch conductors comprising, a conductor section isolated from the main conductor, a contact device positioned alongside the isolated conductor section for engagement with one current collector of an electrically operated vehicle, a relay responsive to a predetermined control current connected between the isolated portion and the conductor operable to control the energization of the trolley frogs from the contact device, a plurality of control circuits on the vehicle including power control circuits controlled by a controller and an auxiliary control circuit providing a path for a predetermined control current connected to said one current collector by time delay control means effective to maintain a circuit after the current collector is deenergized, and a section insulator positioned in advance of the isolated section to effect deenergization of the power control circuits before the current collector engages the isolated section.

CHARLES C. WHITTAKER.